Patented Feb. 18, 1941

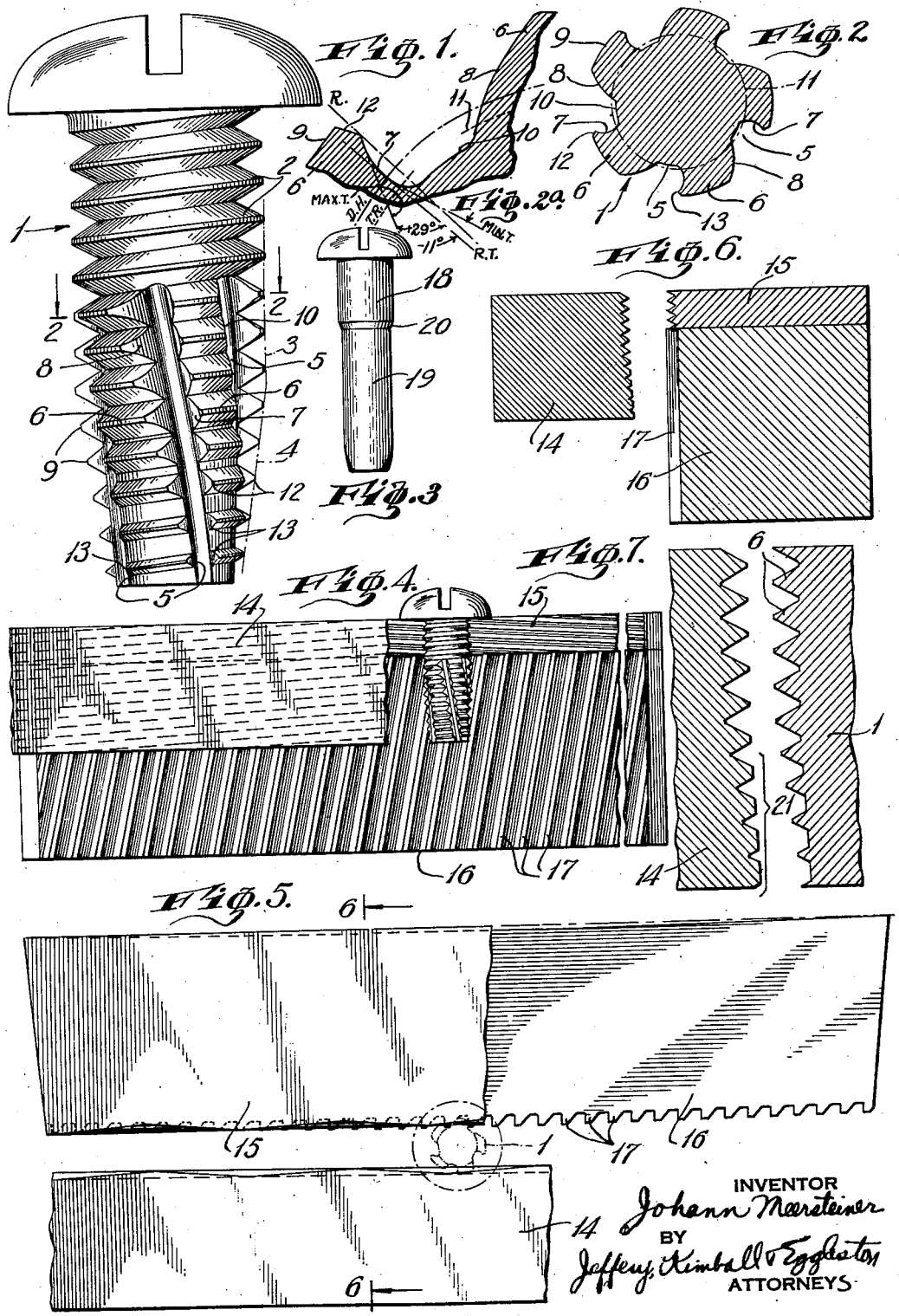

2,232,337

UNITED STATES PATENT OFFICE 2,232,337

METAL FASTENING SCREW, ROLLING APPARATUS, AND METHOD

Johann Meersteiner, West New York, N. J.; Frieda Meersteiner administratrix of said Johann Meersteiner, deceased Application July 20, 1938, Serial No. 220,231

15 Claims. (Cl. 80—61)

The subject matter of this application is a novel fastening screw and a rolling apparatus and method used to produce it commercially. The fastening screw of this application is of the same general character as that disclosed and claimed in the co-pending application filed July 18, 1938, Serial No. 219,768. It is a novel screw of the familiar type of metal fastening screw adapted to cut its own thread in a pre-sized unthreaded hole in metal and like hard material and retain itself in place by frictional contact. It differs from that of the said co-pending application in being of the known variety having a continuously threaded holding portion next its head and longitudinal thread-cutting grooves extending lengthwise of the screw throughout only a part of the threaded shank.

The object of the invention is to provide a screw of the kind stated having the advantageous characteristics of the screws described in the said application, together with further advantages of its own which will be hereinafter set forth.

A further object of the invention is the provision of a novel method of commercially manufacturing screws having longitudinal thread-cutting grooves and in particular screws of the said co-pending application and especially those of the instant application.

Still another object of the invention is the provision of novel apparatus by which the method referred to is effectively carried out.

Fig. 1 is a side elevation of the fastening screw;

Fig. 2 is a transverse section on the line 2—2, Fig. 1;

Fig. 2ª is an enlarged incomplete detail transverse section on the same line through the leading end of a thread segment and across the groove;

Fig. 3 is an elevation of the blank from which the fastener screw may be manufactured, by rolling in accordance with the method and by the apparatus described;

Fig. 4 is a side elevation of the dies in the position in which they are supported in the machine in use, a part of the front or wide threading die having been broken away to show the blank already rolled into approximately its final threaded form;

Fig. 5 is a top plan view of the dies with the screw being rolled between them;

Fig. 6 is a transverse section on the line 6—6, Fig. 5, modified for clearness to show the grooving die ribs in side elevation, and showing the set of three dies arranged for rolling the screw of Fig. 1; and Fig. 7 is an enlarged detail transverse vertical section through the wide threading die and the rolled screw showing at the left the ribs of the die face and at the right the thread of the screw illustrating the nature of the long taper of the Fig. 1 screw and showing the thread complete to the blunt end of the screw.

Fundamental requirements for screws which cut their own thread in the wall of pre-sized holes in metal and other hard materials are that they possess adequate thread-cutting and chip-disposing (waste-disposing) capacity and sufficient effective contact area between the thread of the screw and the thread-cut by it in the wall of the pre-sized hole to retain themselves in place in the hole. Where the metal body or plate is thin, the amount of contact area is correspondingly reduced, and for use in such situations screws of this character have commonly been made with continuous thread adjacent the head of the screw for holding them firmly against loosening vibration, and in advance-thereof thread-cutting grooves running lengthwise for a part only of the length of the shank have been provided for thread-cutting and chip-disposing purposes. The instant screw, in addition to embodying the improved groove contours and relative location is so constructed as to have increased thread-gripping ability as will now appear.

Referring particularly to Figs. 1 and 2, the headed screw 1, which is of the non-burrowing type being neither bit nor drill, is provided with the continuously threaded thread-gripping portion 2 cylindrical in character and having a greater diameter than that of any portion of the screw in advance thereof toward the leading end. The rest of the screw to its blunt leading end may have a substantially cylindrical portion 3 next the thread-gripping portion 2 and a long gradually tapered portion 4 to the entering end. The full diameter of the portion 2 is a few thousandths of an inch, say from three thousandths to ten or fifteen thousandths, the amount increasing with the diameter of the screw size involved, in excess of that of the major diameter of the cylindrical portion 3. This difference is sufficient to cause the screw to firmly grip the thread in the hole and maintain itself in place even where subjected to violent and continued vibration. Grooves 5 extend lengthwise of the shank in the surface or skin portion of the shank-defining thread segments 6 on the portions 3 and 4 of the shank. These grooves which, like the thread, are indented in the metal of the shank, i. e. pressed or worked into it, not formed by removal of metal with consequent disruption of fibres, have their bottoms and sides including the thread segment ends compacted and with unsevered ironed fibres. This will be clear when it is considered that during the formation of the grooves the blank is turning on its axis away from the die rib, while the axis of the blank is moving onward, the action thus being a wedging and consequent flow of metal and not a shearing which is precluded. The grooves 5, as indicated at 7, are in undercut relation to the leading ends of the segments 6 whose trailing ends 8 they give elongated curvature inward and rearward from the crest 9 to the bottom 10 of the groove, or reversewise, outward from the bottom of the groove and as the crest is neared away from the adjacent leading end, the trailing end being thus circumferentially relieved and the contour being slightly convex. The trailing and the thread-cutting ends as in my said co-pending application are of a different configuration and not symmetrical. The groove 5 faces or opens not radially outward but forward, i. e. in the direction of thread-cutting rotation, the median line bisecting the groove angle extending outward and forward through the open side of the groove. The grooves are bottomed between the opposed end faces of the thread segments and separate said end faces at the groove bottom and more widely at the crest. Substantial groove width at the bottom with greater width toward the open side and greatest width along the crest of the thread facilitates waste disposal providing adequate room therefor. V-shaped grooves and especially V-shaped grooves having both sides convex and meeting in a line at or slightly below the adjacent thread valleys are thus avoided. This gives efficient thread-cutting action, good chip-disposing ability in the individual grooves and adequate total chip-disposing capacity where at least three and preferably more longitudinal grooves are employed. This is a vital matter, since excess chips beyond the disposal capacity of the screw may jam and spoil the thread being cut, or when the groove is full result in shearing of the screw. The location of the grooves is such that they do not interfere with the thread-gripping capacity of the part 2 of the screw. It will be noted that as in the screw of the said co-pending application, these grooves which are indented in the metal of the shank, i. e. pressed into it, and which leave the threaded shank undiminished in its substance do not extend substantially deeper into the body of the screw than the root circle of the thread and do not trench upon or weaken the body section, but to better free the chips cut by the leading ends of the thread segments as the screw is turned into the previously prepared hole, the bottom of the groove is located a little below the thread valleys or root circle 11 where the cutting edges end. Smoothness of the groove bottom and freedom from angular pockets in which chips might be caught results from this arrangement. The grooves extend in steep spirals in the reverse sense to the direction of the thread of the screw substantially at right angles to the spires of the thread, which for reasons fully explained in the said co-pending application gives the best location both for thread-cutting and for chip disposal. With this arrangement, the advance ends of each tier of thread segments constitute together a multiple cutter, the successive cutting elements of which from the bottom up (see Fig. 1) act successively but without appreciable gap with a continuous cutting movement which relieves the screw from shock or strain and permits efficiency in the thread-cutting operation. The cutting action is free and smooth.

The undercut portions of the advance or leading ends of the thread segments are shown (see particularly Figs. 1, 2 and 2ª) as stopping short of the crest 9, there being a portion 12 extending outward and rearward from the end of the undercut to the crest. This is the preferred contour for the better flowing materials, such as steel and iron. With this contour the inclined portions 12 act as pressing or ironing means to insure completion of the full cross-section of the thread grooves or valleys. The undercut may however be carried all the way to the crest as illustrated and described in said application and this contour is more desirable for screws to be used with brittle material where the outward pressure of an inclined portion 12 might tend to split the body containing the hole and where a relatively sharp cutting action is especially desired, as is the case also in other pressed materials, plastic and otherwise. In screws like that illustrated in Fig. 1, which end in a long taper to their blunt forward ends, the cutting action, whichever of these contours is adopted, is to a large extent performed by the leading thread segment ends near the entering end of the screw where they are of slight height and are completely undercut to the crest, as is the case with first two or three leading end segments 13 on each groove, starting next the blunt entering end of the elongated taper. The thread-cutting ends following either immediately or with the interposition of other thread-cutting segments, trail the leading ends 13 and complete the cut of the thread groove, finishing it out to its full intended cross section with the aid of some of the thread ends approaching full height and those reaching it.

The nature and range of the undercut, as well as modes of producing it by rolling, are fully discussed in my said co-pending application Ser. No. 219,768, but, summarized here, they are generally to the effect that the curved undercut is of such a character as would be produced by rolling between a threading die and a grooving die, whose grooving die rib face was within the theoretically permissible undercut-producing angular range to the vertical (0°) of from +5° in advance of the vertical to −32° behind the vertical, inclusive, the plus angles corresponding to curvatures suitable for screws to be used in hard and tough materials, such as iron and steel, and the minus angles, especially the large minus angle, corresponding to softer materials or brittle materials, such as Bakelite and other plastics, compressed materials, etc. In this range the plus angles give an undercut which stops short of the crest and the large negative angle (−32°) gives an undercut extending all the way to the crest. Large positive angles, greatly exceeding the undercut producing range above given, give substantially convex curvature to the leading ends of the thread segments and are therefore unsuitable. Smaller positive angles in excess of the undercut-producing range are usable though at a sacrifice of ease and cleanness of cut, since the segment end faces they produce do not cut so easily and are harder to turn in. As indicated in Fig. 2a, the range in degrees of the undercut measured between the radial tangent (R. T.) at the point of maximum undercut and the maximum and minimum tangents drawn respectively to the extreme outer point of the undercut and to a point on the root circle of the teeth (T. R.) is +29° (between the radial tangent and the maximum tangent) and −11° (between the radial tangent and the minimum tangent). It will be understood that slight deviation from these theoretical ranges is to be made where special hardness, toughness and intractability or on the other hand softness, ease of flow, etc. of the materials, as well as wear of the dies, make such deviation expedient. All of the undercuts have this in common, which may be stated to be characteristic of all undercuts of leading segment ends in applicant's screws, that they are essentially abrupt, that is to say, they have more of the radial than of the circumferential, i. e. the undercut approaches more nearly coincidence with the radial line through the outer end of the undercut than it does coincidence with the circumference drawn through that point around the axis of the screw as center. This means that they combine effective cutting curvature with the solid backing of the entire, or practically the entire, thread segment.

This abrupt character is emphasized where the diameter of the blank compared with the depth of the teeth to be rolled is increased until the curve of the undercut approaches a straight line. And when the elements of the advance end of a thread segment are actually or essentially radial, they are regarded as steep or abrupt.

In a screw provided with a continuously threaded portion as well as a thread-cutting portion there is less need to follow closely the usual proportional ratio between the arcuate length of the threaded segment and the width of the groove on the pitch circle. This ratio in screws in which the grooves extend throughout the entire threaded length of the shank should be not less than unity and may, for example, be 1.3–1 or 1.5–1. In a screw of the end-to-end groove type just mentioned, the self-holding property of the screw in the thread it has cut in the wall of the pre-sized hole depends on the amount of the contact area of the thread of the screw with the thread of the wall of the hole cut thereby. In a screw of the kind shown in Fig. 1, however, the continuously threaded portion 2 furnishes ample thread contact area, particularly in the screw of this application, in which there is not only the usual frictional holding effect but a definite gripping action which firmly holds the screw in place notwithstanding its subjection to continuous and rapid vibrations, as when the screw is used as a fastening for machinery plates and in analagous relationships.

It will be seen also that on this account less exact attention need be paid to the size of the drill hole into which the screw is to be turned. Such hole may without unfavorable effect be somewhat larger in a screw of this type. However, as in the end-to-end groove screw of the said co-pending application, the drill hole may be much smaller than that customarily found necessary in other screws of this general character which cut their own thread in pre-sized holes, owing to the enhanced cutting ability of applicant's screws, due to the superior cutting tool contours of the leading ends of the thread segments, to the smooth open character of the grooves and to their multiplicity. Owing to these factors the drill hole diameter (D. H.) may range (and preferably does range) from approximately the diameter of the root circle of the screw to the diameter of the said root circle plus twice 20% of the depth of the thread on the screw. This gives a cut in the wall of the hole of 80% of the depth of the thread on the screw. The ability to establish so high a cut percentage is a distinct practical advantage of this screw.

Assuming a pre-sized hole preferably within the diameter range stated, the operation of the turning in the screw is as follows: The tapered entering end of the screw is inserted into a previously prepared hole until its tapered portion contacts near its leading end with the wall of the hole, whereupon the metal of the wall as the screw is pressed inward and turned rolls freely and continuously into the open side of the forwardly facing groove. The trailing end, i. e. the trailing end of the thread segment next in advance of the groove, with its relieved crest and contour of elongated curvature moving forward easily in advance of the groove and of the leading end of the next following segment leads or feeds the metal into the groove continuously as the leading ends of the thread segments 13 in Fig. 1 advance, and by their concave undercut end edges, smoothly cut from the wall of the hole a thin chip which drops into the adjacent groove 5. Successive cutting ends repeat this action, each time, a little further out from the screw axis. Each successive cut thus gradually and continuously deepening the thread groove. Most of the cutting is done on the taper. It will be noted that, even where the undercut does not proceed all the way to the crest on the segment ends of full height, it does so proceed on the first cutting leading ends of segments on the screw taper to be engaged, and on a number of next succeeding leading segment ends thereon, since these are of little height. Following thread segments trailing in the same thread groove successively present their advance undercut edges, until thread segment ends of the full thread height force the metal of the thread valley to its full intended depth and cross-section. Where the undercut is not carried all the way to the crest, the backwardly slanting portions 12 have a continuous ironing action to complete the thread in the wall of the hole in exact, smoothly continuous fashion. The continuous thread on portion 2 of the screw, which thread is in continuity with and of the same pitch as that of the thread on the part of the shank in advance of it, follows in the thread cut, although as hereinbefore stated, the diameter of the continuously threaded portion of the shank is by some thousandths of an inch greater than the maximum diameter of the interrupted thead which immediately precedes it. As the screw continues to be turned in, the continuous thread next the head is wedged into close frictional gripping contact with the thread previously cut by the leading longitudinal grooved portion of the shank of the screw, until the under side of the head of the screw seats firmly on the face of the body containing the pre-sized hole or on the plate or other article to be secured by the screw.

Screws of this particular type are required to have both sufficient cutting ability and adequate chip disposal facilities in grooves which are shorter than the grooves in the end-to-end type of screw, but this is satisfactorily accomplished by the use of not less than three grooves although more are preferable, said grooves, for some purposes (as use in dead end holes), extending approximately half the length of the threaded shank or better two-thirds its length or even more in the case of long screws.

The fabrication of screws of this character commercially is a matter of substantial difficulty. One way of accomplishing that end however is illustrated and described herein in the rolling apparatus illustrated in the drawing and in the rolling method described in the specification which apparatus and method, in their broader aspects, are applicable to the production of either the end-to-end type of fastening screw illustrated in the said co-pending application or to the production of the screw of this application in which the grooves do not extend to the head, i. e. the drive end of the screw. However, in another aspect, the apparatus and the method, both of which are the invention of the present applicant, are definitely directed and adapted to the efficient fabrication of screws of the kind herein illustrated and described.

One illustrative and preferred apparatus and method of fabricating the invented screw is characterized by rolling the longitudinal grooves and the threads they interrupt in the skin of the blank in the same operation at opposite sides of the blank, the thread-forming and the longitudinal groove-forming elements (die ribs) being allocated to the respective dies so that they perform their distinctive functions without interference and in harmony. The threading ribs and the grooving ribs cross each other continuously during the relative reciprocation of the dies, and the threads and grooves are increased gradually and proportionately to each other, until each attains its full cross-section in the finished groove. Applicant's co-pending application, Serial No. 127,266, filed February 23, 1937, of which the present application is a continuation in part, is directed to such a method and apparatus.

The further particular and preferred apparatus and method of this nature is illustrated in Figs. 6 and 7 inclusive, wherein is shown in the relative positions of their use a set of threading and grooving dies. These are the wide threading die 14, usually the fixed die, whose width is at least that of the longest screw to be rolled, the narrow screw-threading die 15, both of which dies are provided on their working faces with milled threading ribs of usual character, except in the respect hereinafter pointed out in connection with the further description of die 14, and the groove die 16 having die ribs 17 of suitable contour substantially as indicated, particularly in Fig. 5, milled into its working face, the milling angle being approximately 11°, and for short screws 17°, the face angle varying through the approximate range already stated of from +5° to —32°, the preferred angle being zero, and the back slope angle of the die rib being approximately 45° which, as stated in applicant's co-pending application, Serial No. 219,768 permits ease of rolling and has a rather wide applicability. It will be evident that the parts of threading dies 14 and 15 which are opposed to each other would correctly thread the portion of a blank rolled between them. Also, considering only the parts of the dies 14 and 16 opposite each other, these dies would roll interrupted threads on a suitable blank rolled between them, and it will be further clear that if the narrow threading die 15 were lifted off the top of the grooving die 16 and the wide threading die 14 were moved down opposite to the grooving die, the set of dies thus produced would roll end-to-end grooved screws from suitable blanks. The problem of performing both these operations in the same passage of a blank between the dies rolling it is, however, another matter. It has been met by arranging the dies in the combination shown in the figures above referred to, and perhaps most clearly, in Figs. 4 and 6, and by employing a headed offset blank, that is, a blank having adjacent its head or following end, a substantially cylindrical radially offset portion or shoulder 18 of relatively large diameter corresponding in length substantially to the length of the continuously threaded portion on the shank of the screw, the part 19 of the blank next in advance of 18 being of less but substantially uniform diameter, the difference in diameter of the successive shank portions 18 and 19 being more than enough to make up for the excess radial displacement of metal of the portion 19 due to the formation of the longitudinal grooves in the rolling of the interrupted thread. The shoulder 18 is thus overcompensating. The transition from one such portion to the other is preferably softened from the abruptness of a shoulder-end perpendicular to the blank axis and is eased, as by a slight bevel 20. This mode of connection of the portions 18 and 19 insures greater nicety in the threading from one to the other. The leading end of the blank shown in Fig. 3 has a slight taper. This difference of diameter enables the material of the part 19 of the blank to be displaced in the main radially outward and to some extent axially upward on the bevel or modified transverse shoulder-end during the rolling process of the grooving die ribs in the formation of the longitudinally extending grooves, at the same time that metal of the shoulder 18 is being forced downward at 20. The thread formed in this way on this part of the blank flows or matches very exactly into a continuing screw thread of the same pitch as that of the continuously threaded portion produced between the threading dies 14, 15.

It will be understood that this is a procedure of considerable delicacy, there being a necessity of exactness in the continuity of the alignment of the continuous and the dis-continuous threads produced in the way stated in this one operation. In seeking to meet this phase of the problem, the applicant has found that it is peculiarly necessary that the action of the threading ribs and the grooving ribs of their respective opposite dies should be gradual and continuously proportionate to each other, and that the true conformity to this ideal requirement is made completely possible, or certainly much more nearly so, by curving the working face of one of the dies, the grooving die in the drawings, lengthwise thereof, both ends of the die surface being gradually withdrawn somewhat backward from a plane tangent to a point between the ends of the die about midway of its length. It will be apparent that the location of this point may be varied, and the amount of this curvature is not definitely fixed and not the same under all conditions as to coarseness or fineness of thread, the nature of the thread in other respects, the hardness and toughness or softness of the material, etc., all of which present varying factors which have to be considered in the practical operation of the rolling. Speaking very roughly, however, the extent of the curvature approximates the depth of the thread valleys in the threading die or the height of the ribs in the grooving die, the latter dimension being about 30% greater than the former, since space must be provided between the ribs of the grooving die in order to allow the expansion radially of the screw as it is being rolled up from the blank without the sharp edges of the leading ends of the thread segments being dulled by coming in contact with the parts of the die base between successive ribs. The rationale of the effectiveness of the curvature appears to lie in relieving the rolling pressure somewhat both at the beginning and more particularly at the end of the rolling operation by curving longitudinally the surface of one of the opposed die faces. The effect of such relief of rolling pressure being, in the first place, to avoid abrupt and ill-regulated movements of the metal occasioned by the die ribs so as to insure a more gradual and more nearly theoretically perfect thread-rolling action, and after the blank has been rolled to approximately the final form of the screw, gradually relieving it of excess pressure and allowing it to reform itself to the theoretically ideal contours required. The curve of the die face is preferably greater at the delivery end at the entering end so that the final pressure is less than the initial pressure, both being less than the pressure at midpassage. In making this change in the grooving die a more or less corresponding change should be made also in the narrow threading die which is given a curvature endwise of the die approximating that of the grooving die face, this conformity being designed more to harmonize the two dies than for any more precise correspondence. This curvature of the grooving die 16 appears very clearly in Fig. 5, wherein it is also apparent that the grooving die face is slightly in advance of the corresponding face of the narrow threading die 15, the ends of the grooving die ribs projecting slightly beyond the plane of the threading die face as will be seen in the said figure. The dies are so mounted in the die bed as to permit adjustment—in particular of the die 15 crosswise and lengthwise of the die 16. They may also be rearranged relatively as already indicated.

The screw of Fig. 1 is given its elongated taper without interference with the rolling at the same time of the longitudinal grooves by the expedient (not in itself new) of giving the portion of the wide threading die 14 which takes part in that formation of the thread near the end of the screw blank a curve or incline 21, the nature of which will appear in Fig. 6 and in the enlarged detail Fig. 7 at the left of the figure, wherein it will be seen that the line of the root of the ribs, as the bottom of the die is approached, inclined or slightly curved so that if the die were not treated further the lands of the die ribs would project beyond the plane of the rest of the lands on the die in an inclined plane or in a curve. That this is not the case in the actual die illustrated in the drawing is due to the fact that part of these ribs which would otherwise project to the full rib height has been ground off so that the lands occur at a lower level and are flatter and wider. This results in rolling an elongated taper on the screw and in giving a sharp and correct contour to the thread on the screw taper all the way to its blunt end. The root line of these teeth may vary but is shown herein as extending inward as compared with the root line on the substantially cylindrical portion 3 of the interrupted thread portion of the shank.

The dies shown in the drawing and particularly the grooving die 16 correspond in their working face contours, and in the contour of their die ribs, and also in the relative arrangement and spacing thereof closely to actual dies, which however may be on a different, often a smaller scale and which have the outside corner at the end of the face of the die rib rounded to promote ease of rolling and smoothness and accuracy in the rolled screws. The nature of the die profiles, their proper angles, the way in which they are ascertained for screws of particular sizes and characters of thread are fully set forth in said co-pending application, Serial No. 219,768 filed July 18, 1938, which is incorporated herein by reference and it is sufficient to say here that the spacing of the die ribs is determined by rolling the pitch circle of the screw on the pitch line of the die (midway between the end of the grooving die and the beginning of the 30% clearance already referred to), the number of grooves having been first determined and the circumference of the screw pitch circle having been divided by the number of the grooves. The space between one die rib face and the next on the die pitch line is occupied by a rib with the groove next it, and the allocation of this space respectively to die rib and to groove is determined by the point of intersection of the back slope of the die rib with the die pitch line.

What is claimed is:

1. Apparatus for rolling screws comprising in combination a pair of opposed threading dies, and a grooving die having its working face provided with steep grooving ribs transversely of the die face, said face being curved in the direction of the length of the die backward from the plane of the most advanced part of said face between its ends, the working faces of one of the threading dies and the grooving die being in substantial alignment transversely, the grooving die projecting slightly beyond the face of the adjoining threading die and the said threading die being curved in the direction of its length from end to end in general conformity with the curve of the working face of the grooving die, the other threading die being opposed to the grooving die as well as to its companion threading die.

2. The method of making a fastening screw comprising, rolling a thread into an over-compensating substantially cylindrical offset portion of a headed blank adjacent the head between dies having corresponding threading portions and, in the same passage of the blank between the dies, rolling, into an advance portion of the blank of lesser and substantially uniform diameter and including an intermediate bevel between said portions, a thread continuing the thread of the threaded portion with longitudinal reverse-spiral grooves defining thread segments and undercutting their leading ends, between a grooving die and a threading die, each acting separately at opposite sides of the blank gradually and in correspondence with each other until the full cross section of the threads and grooves has been arrived at.

3. The method of making a fastening screw comprising rolling a thread into an over-compensating offset portion of a headed blank next the head between dies having corresponding threading portions and, in the same passage of the blank between the dies, rolling, into an advance portion of the blank of lesser diameter and including an intermediate bevel between said portions, a thread continuing the thread of the threaded offset portion, with longitudinal grooves defining intermediate thread segments and undercutting their leading ends, said rolling of the advance portion taking place between a grooving die having its working face curved lengthwise throughout the length of the die, the threading die with which the grooving die is in substantially continuing relation also having substantially similar longitudinal curvature.

4. A fastening screw adapted to cut its own thread in a pre-sized hole, comprising a shank having a head, a continuously threaded thread-gripping portion of cylindrical contour adjacent the head, and a threaded thread-cutting portion in advance of the thread-gripping portion having longitudinal grooves indented therein, wide at the bottom and wider at the crest, facing in the direction of thread-cutting movement, with thread segments between them having their leading ends undercut by the grooves and their trailing ends having elongated curvature, the grooves having their bottoms and sides including the thread segment ends compacted and with unsevered ironed fibres.

5. A fastening screw adapted to cut its own thread in a previously prepared hole in a metal body, comprising a shank rolled to form both a threaded thread-gripping portion of cylindrical contour adjacent the driving end and a threaded thread-cutting portion in advance of the thread-gripping portion having longitudinal grooves with thread segments between them having their leading ends undercut by the grooves and their trailing ends having elongated curvature, both the thread and the groove bottoms and sides being compacted and having unsevered ironed fibres, the outside diameter of the thread-gripping portion being slightly greater than the maximum outside diameter of the thread-cutting portion, for rotation in and frictional engagement with the thread cut by the thread-cutting portion.

6. A fastening screw having its shank provided with a continuously threaded thread-gripping portion next its head end, and a threaded thread-cutting portion extending from said thread-gripping portion toward the entering end, said thread-cutting portion having several steep longitudinal grooves with thread segments between them defined thereby, leading ends of thread segments having thread-cutting edges undercut short of the crest, and continuing from the end of the undercut outward and rearward to the crest, and the trailing ends of the segments having elongated curvature, the bottoms and sides of the longitudinal grooves being compacted and having unsevered, ironed fibres, the thread-cutting grooves extending short of the thread of maximum diameter.

7. Apparatus for rolling screws comprising a die having a threading portion provided with threading ribs, and an adjacent grooving die portion extending substantially the whole length of the working face of said threading portion and in general crosswise extension thereof and having transverse grooving ribs in its working face and a threading die opposed to and cooperating with both of the die portions named, said dies being relatively reciprocable endwise, and one of the opposed respectively threading and grooving working die faces having its surface adjacent the entering end curved lengthwise back from the points between the ends of that die face most advanced toward the opposed die face.

8. In apparatus for rolling screws, a threading die, and a grooving die opposed thereto for relative endwise reciprocation and having steep transverse grooving ribs in its working face, one of said dies presenting a working surface gradually curving toward each end back from the plane of its most advanced frontal points, the curvature being roughly speaking on the order of the height of a die rib.

9. The method of rolling a fastening screw comprising rolling a continuous thread in a substantially cylindrical portion of a headed blank next its head, and simultaneously rolling in a longitudinally extended part of the blank next in advance of the substantially cylindrical portion and of lesser and substantially uniform diameter both a thread in continuation of the thread on the part next the head, and steep longitudinal grooves defining thread segments and undercutting the leading ends of the segments, and giving the trailing ends of the segments elongated curvature.

10. The method of making a fastening screw comprising rolling, in the same relative die movement, into an enlarged overcompensated radially offset portion of a headed blank adjacent its driving end, a continuous thread and into a substantially cylindrical portion of the blank of lesser section in advance of said offset portion, a thread in continuation of the thread of the offset portion with longitudinal reverse-spiral grooves defining thread segments and providing them with abrupt cutting edges at their leading ends.

11. The method of rolling a fastening screw comprising rolling threads and longitudinal grooves defining intermediate thread segments having their leading ends provided with cutting edges into a blank with relatively low rolling pressure at the beginning of the passage between the rolling dies, increasing the pressure on the blank during the rolling passage until the screw roughly approximates its final form, and thereafter continuing to roll the screw between die portions the succeeding ribs on one of which gradually decrease in height.

12. The method of rolling a fastening screw comprising rolling continuous thread into a substantially cylindrical portion of a headed blank next its head, and in continuance of the continuous thread an interrupted thread with longitudinal grooves in a longitudinally extended part of the blank next in advance of the substantially cylindrical portion and of lesser and substantially uniform diameter, the rolling being accomplished at a single passage between the dies and starting gradually with relatively slight pressure on the blank, continuing with gradually increasing pressure to a maximum as the blank is rolled until it roughly approximates the final form of the screw and thereafter until the completion of the screw under pressure gradually reduced to a point below the starting pressure.

13. The method of making a fastening screw comprising rolling at the same time continuous thread into an overcompensated enlarged substantially cylindrical portion of a threaded blank next its head end, and threads with longitudinal grooves defining thread-cutting thread segments in an undercompensating substantially cylindrical blank portion of less diameter leading the enlarged portion.

14. The method of rolling a fastening screw comprising, rolling a thread into substantially the whole length of the shank and in so doing giving the leading end of the shank of the screw a taper and producing on the taper full threads of uniform cross-sectional crest contour, and, in the same operation, rolling longitudinal grooves in the taper part of the screw, completely undercutting leading ends of the thread segment of less than full thread height, and undercutting leading ends of thread segments trailing the same, to points short of the crest.

15. The method of making a fastening screw, comprising rolling, in the same passage between the rolling dies, into each of two successive offset shank portions of a blank of different but substantially uniform respective diameters, respectively, continuous thread on the shank portion next the drive end and, on the portion of lesser diameter in advance thereof, thread, in continuance of the thread on the shank portion of greater diameter, with steep longitudinal grooves defining thread segments and providing them with abrupt leading thread-cutting ends and with extended trailing ends.

JOHANN MEERSTEINER.